United States Patent [19]

Ludwig et al.

[11] 4,072,819
[45] Feb. 7, 1978

[54] CIRCUIT ARRANGEMENT FOR STORING INFORMATION FORMED OF TELETYPE CHARACTERS

[75] Inventors: Martin Ludwig; Wennemar Eickenscheidt, both of Munich, Germany

[73] Assignee: Siemens Aktiengesellschaft, Berlin & Munich, Germany

[21] Appl. No.: 729,462

[22] Filed: Oct. 4, 1976

[30] Foreign Application Priority Data

Dec. 19, 1975 Germany ............................ 2557494

[51] Int. Cl.² ............................................ H04L 13/08
[52] U.S. Cl. ................................................. 178/17.5
[58] Field of Search .................. 178/17.5, 17 R, 23 R, 178/26 R; 340/173 DR

[56] References Cited

U.S. PATENT DOCUMENTS

| 3,836,894 | 9/1974 | Cricchi | 340/173 DR |
| 3,912,863 | 10/1975 | Patience | 178/17.5 |
| 3,940,747 | 2/1976 | Kuo et al. | 340/173 DR |

Primary Examiner—Thomas A. Robinson
Attorney, Agent, or Firm—Hill, Gross, Simpson, Van Santen, Steadman, Chiara & Simpson

[57] ABSTRACT

A circuit arrangement is disclosed for storing messages formed of Teletype characters in a Teletype system. The Teletype system has a reception control which can be supplied with Teletype characters from a Teletype line or an input device. The Teletype system also has a transmission control which can emit Teletype characters to a Teletype line or the reception control. A memory unit is supplied with Teletype characters from received and written-in messages via the reception control. A memory in the memory unit has electronically triggerable memory elements arranged in matrix-like fashion. The Teletype characters may be stored in the memory and are not lost when an operational voltage to the memory is switched off. The memory emits Teletype characters of a message which is to be transmitted to the transmission control.

13 Claims, 7 Drawing Figures

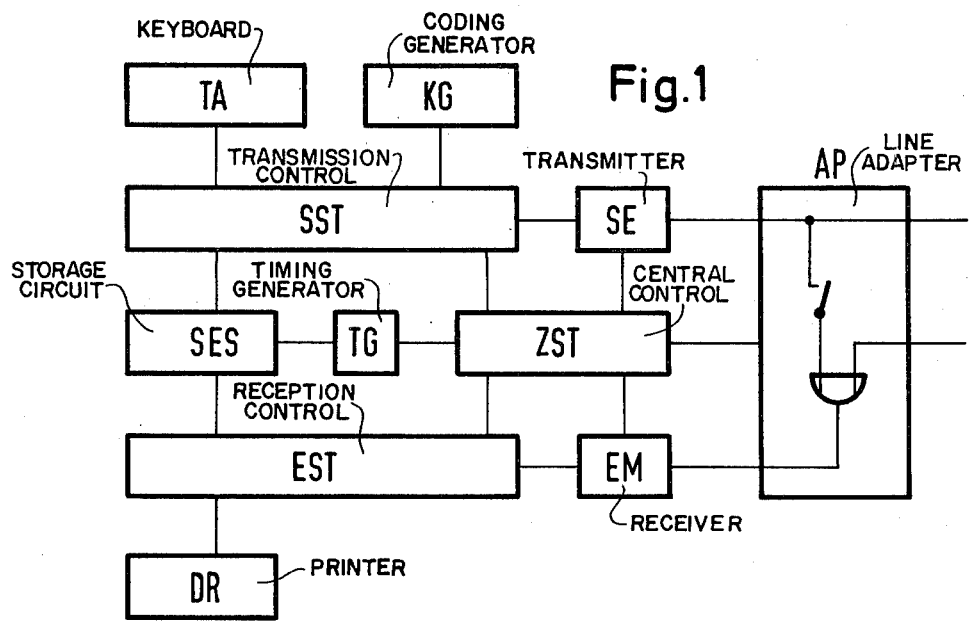
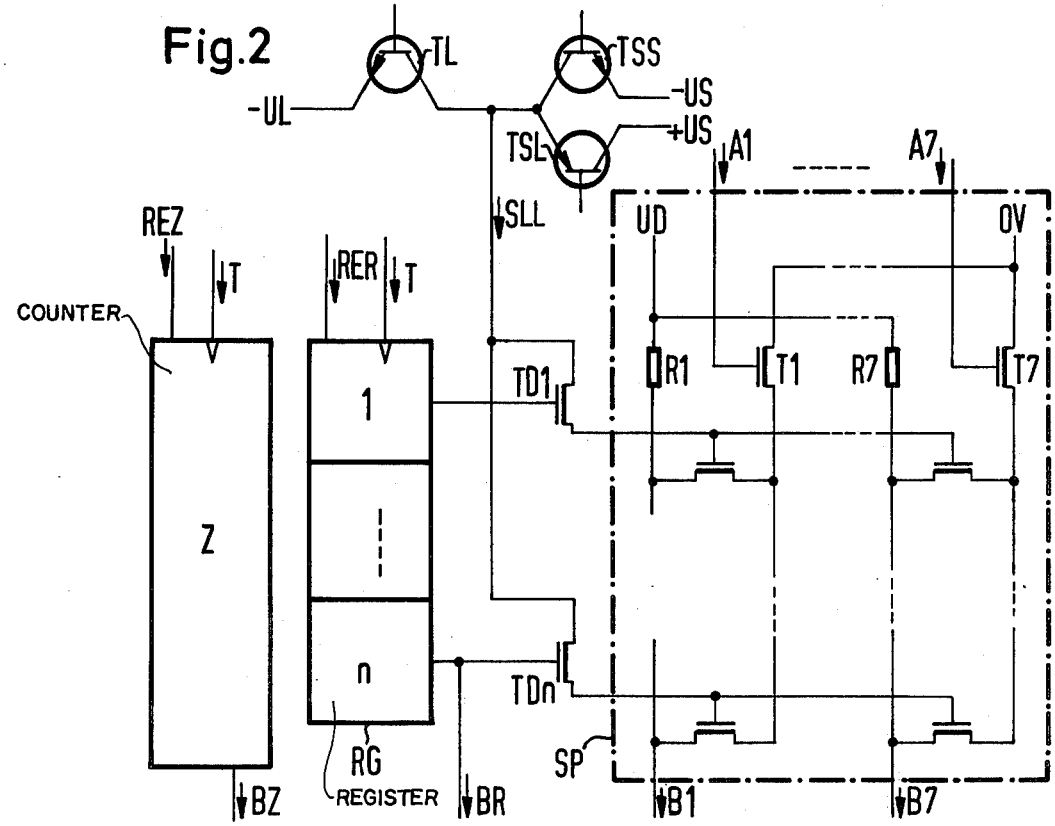

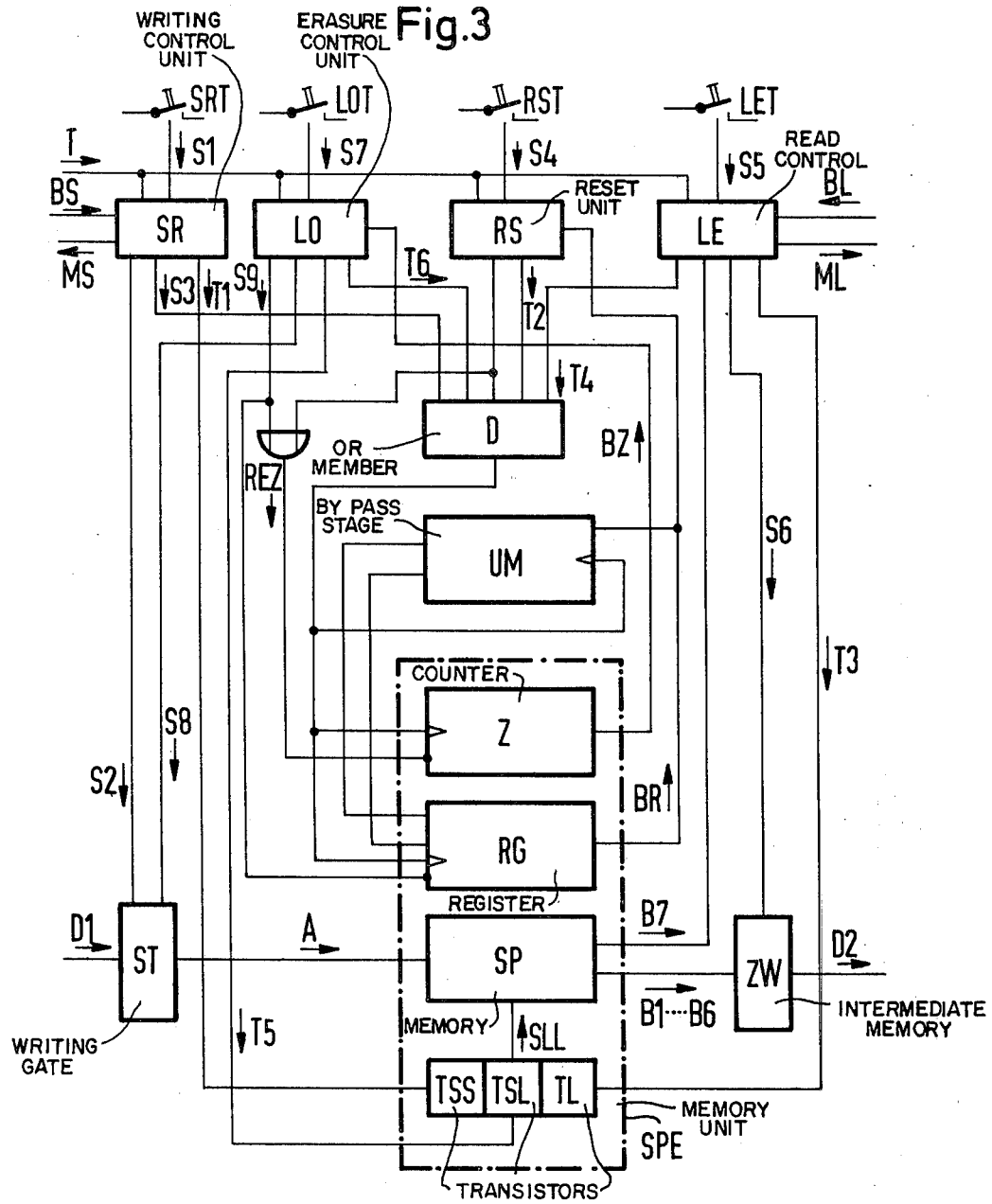

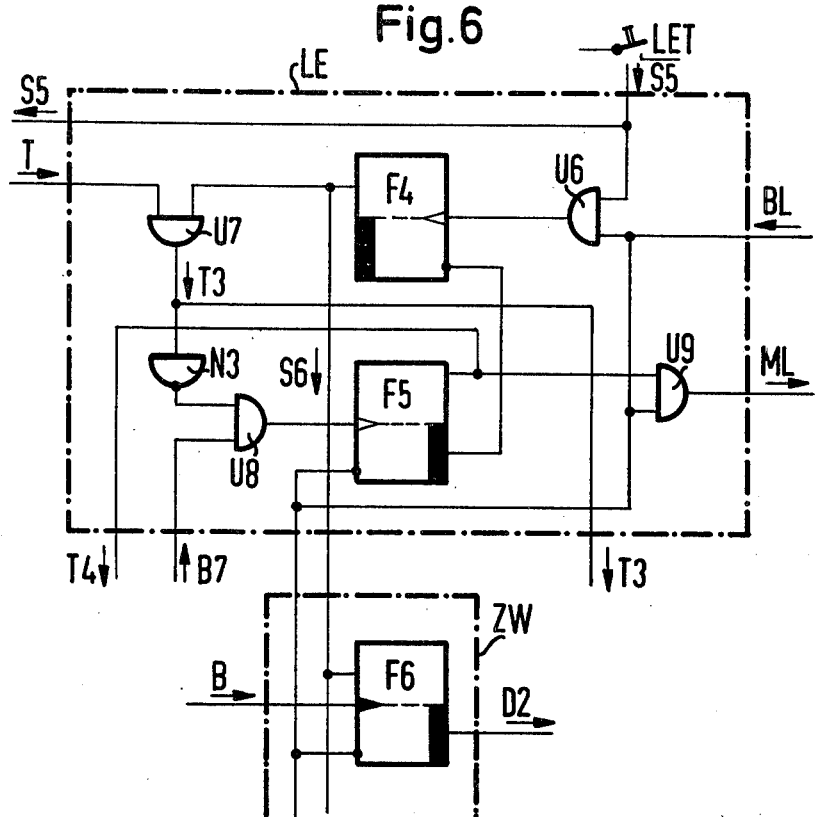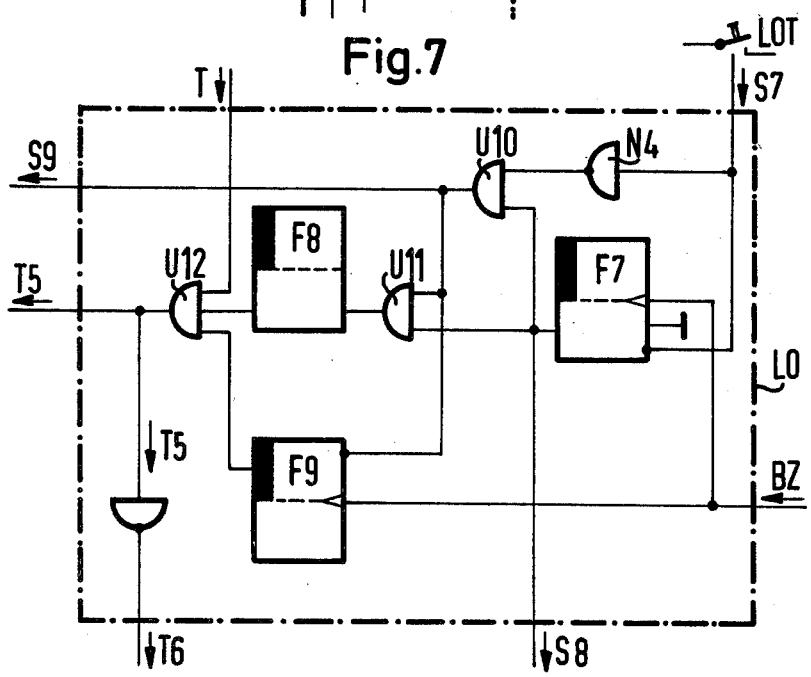

CIRCUIT ARRANGEMENT FOR STORING INFORMATION FORMED OF TELETYPE CHARACTERS

BACKGROUND OF THE INVENTION

1. Field of the Invention

The invention relates to a circuit arrangement for storing information in the form of Teletype characters in a teletypewriter.

2. Description of the Prior Art

A Teletype system typically has a reception control which is supplied with Teletype characters from a Teletype line or an input device, and which has a transmission control for emitting the Teletype characters to the Teletype line or to a reception control.

Punched-strip devices are already known in the art for storing information formed of Teletype characters. A great majority of teletypewriters are equipped with these devices. These teletypewrtiers are operated in such a way that, in a mode of operation known as "local operation", a message, usually of short duration, is put in by the keyboard of the teletypewriter, at a desired writing speed, and is punched into the punched strip as intermediate memory. The message stored in the punched strip is subsequently transmitted in a mode of operation known as "line operation" with maximum possible speed. In this manner, messages are transmitted with as few errors as possible and with the lowest possible costs. Such punched-strip devices, however, have the disadvantages that they contain mechanically moving parts which are subject to wear, are subject to maintenance, and do not operate noise free. Furthermore, the punched-strip devices have the disadvantages that they have relatively large dimensions and that the same punched strips cannot be used several times for storing different messages.

SUMMARY OF THE INVENTION

It is an object of this invention to provide an arrangement for the storage of messages consisting of Teletype characters, whereby such an arrangement has no mechanically moving parts.

In accordance with the invention, the object is achieved by use of a circuit arrangement having a storage unit which is provided with the Teletype characters of a received or an input message via a reception control. The storage unit contains a memory formed of electronically triggerable memory elements within which the Teletype characters may be stored and are maintained after an operational voltage is switched off, and which emits to a transmission control the Teletype characters of a message which is to be transmitted or to be read out.

The arrangement in accordance with the invention has the advantage that it operates noise free, does not require maintenance, and does not contain any parts which are subject to wear. Furthermore, the circuit arrangement requires a very small volume, particularly when highly integrated electronic circuits are used for the storage unit. During operation of the arrangement, very little electric power is required. Furthermore, no waste material is produced since, as opposed to a punched strip, the storage medium can be reused.

In order that the Teletype characters are not changed in the memory after the teletypewriter has been switched off, it is advantageous to use a semiconductor memory consisting of MNOS (metal-nitrite-oxide-substrate) transistors which can be written on as often as desired.

In order to transport and exchange the memory in a simple manner it is advantageous if the memory is pluggable.

A favorable triggering of the memory results when the storage elements in the memory are arranged in the form of a matrix formed of several lines and several columns.

In order to trigger the Teletype characters in the memory, it is preferable if the storage unit contains a register apart from the memory, the number of digits of which is equal to the number of lines of the memory which are to be written on or to be read out, respectively, and which states the line of the memory which is written on or read out.

In order to determine when the memory cannot receive any more Teletype characters, it is preferable if the storage unit contains a counter, the counting capacity of which is equal to the number of lines of the memory which are to be written on or to be read out, respectively, and which emits a signal at its output when all lines of the memory have been written on or read out.

The writing-in of the memory is carried out in a simple manner when the memory unit is connected with a writing control unit which is supplied by a reception control with a signal triggering the storing of Teletype characters. The writing control unit emits a signal to a writing gate for switching the Teletype characters which are to be stored, through to the memory, and which produces the signals for aiding the writing-in of the Teletype characters into the memory.

In order to read the Teletype characters, the memory unit is connected with a read control unit which is supplied with a signal triggering the read-out of the Teletype characters from the memory. The read control unit also emits signals towards the memory unit with the help of which the Teletype characters are read out from the memory, and emits a signal towards an intermediate memory within which the read-out Teletype characters are temporarily stored.

In order to reset to the beginning of a message, the storage unit is connected with a reset control unit which is supplied with a signal triggering a reset of the memory to the beginning of the message, and which emits the signals towards the counter and the register for resetting them to their initial values associated with the beginning of the message.

If a memory is provided whereby erasure is effected by way of writing in given equal binary values, it is preferable to provide an erasure control unit which is supplied with a signal triggering the erasure of the memory, which emits a signal towards the writing gate causing the emission of equal binary values, and which emits signals towards the memory unit by use of which these binary values are written into the memory.

In order to be able to correct faulty Teletype characters, and to quickly find a position in the memory which can be written on, control units are provided by use of which individual Teletype characters may be corrected in the memory and/or a writable position in the memory can be automatically located.

BRIEF DESCRIPTION OF THE DRAWINGS

FIG. 1 illustrates a block circuit diagram of a teletypewriter;

FIG. 2 illustrates a circuit diagram of a storage unit;

FIG. 3 illustrates a block circuit diagram of the circuit arrangement for storing Teletype characters;

FIG. 6 illustrates a circuit diagram of a read control unit and an intermediate memory; and FIG. 7 illustrates a circuit diagram of an erasure control unit.

DESCRIPTION OF THE PREFERRED EMODIMENTS

Figure 4:
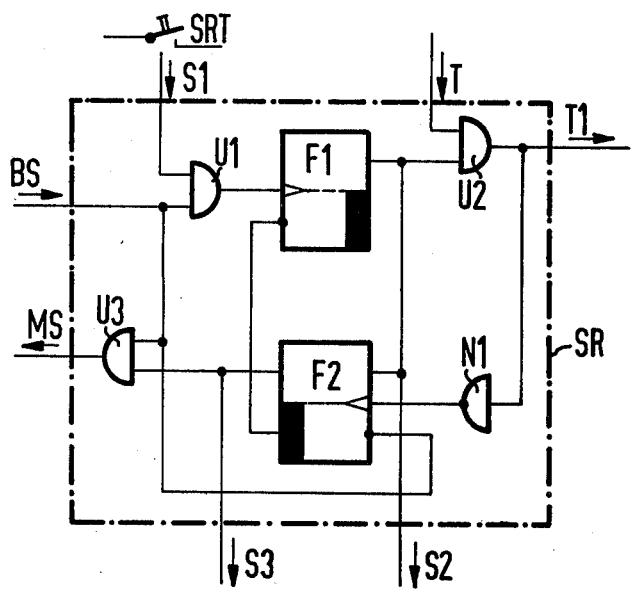
FIG. 4 illustrates a circuit diagram of a writing control unit.

The block circuit diagram of a teletypewriter shown in FIG. 1 illustrates several transmissiion and reception peripheral blocks and central blocks for the control of the teletypewriter. The teletypewriter is connected with a Teletype line via a remote switching system which has not been shown. The keyboard TA, a coding generator KG as well as a transmission control SST associated therewith, are shown as transmission peripheral units. A printer DR and a reception control EST have been shown as reception units. A central control ZST, a timing generator TG, a transmitter SE, a receiver EM and a line adapter AP comprise the central portion of the teletypewriter. Furthermore, the teletypewriter contains a circuit arrangement SES for storing messages formed of Teletype characters.

Parallel coded characters emitted by the transmission units are converted by the transmitter SE into serially coded characters and are processed towards the Teletype line as Teletype characters via the line adapter AP. The Teletype line supplies the Teletype characters as serially coded signs to the receiver EM via a first input of an OR member in the line adapter AP, and the receiver EM converts them into parallel coded characters. The reception control EST processes these characters to the printer DR.

The central control ZST controls the time succession of functions in the teletypewriter and is connected with the transmission control SST, the reception control EST, the transmitter SE, the receiver EM and the line adapter AP. The line adapter AP contains a switch via which the transmitted characters are connected to the receiver EM from the transmitter SE via a second input of the OR member, such as during local operation or during line operation in the case of semiduplex.

The circuit arrangement SES connects both with the transmission control SST and also with the reception control EST since, depending on the mode of operation, it assumes different functions. Furthermore, the circuit arrangement SES is connected with a timing generator TG which produces timing pulses which are emitted towards both the circuit arrangement SES as well as to the central control ZST.

In "writing" operation, the circuit arrangement SES receives parallel coded characters from the reception control EST. They are stored one after the other, character-by-character in the circuit arrangement SES. The origination of these characters can either be the keyboard TA, the timing generator KG, or the Teletype line. In "reading" operation, the circuit arrangement SES emits parallel coded characters towards the transmitter SE via the transmission control SST. These characters are sent towards the Teletype line via the line adapter AP and/or are supplied to the printer DR via the receiver EM.

The circuit diagram shown in FIG. 2 shows a memory SP within the storage unit SPE shown in FIG. 3 suited for the application and circuit arrangement SES, with transistors TS and TL required for writing-in and reading-out the characters. The memory SP comprises a semiconductor memory whose storage elements are subdivided in matrix fashion such as with seven columns and $n$ characters, where $n$ is an even power of 2, for instance 2,048. Furthermore, the memory unit SPE contains a register RG with as many positions $n$ as there are lines in the memory SP. This register RG triggers the line of the memory SP which is to be written on or read out, respectively. Furthermore, the storage unit SPE contains a counter Z which counts to the number $n$. Finally, the memory unit SPE contains transistors TD1 through TDn between the register RG and the memory SP. These transistors function to switch through the writing, reading or erasing impulses to the respective line of the memory SP which is to be triggered. The counter Z is supplied with a signal REZ to set the counter back to an initial value 0. The counter is supplied with timing impulses T and signals BZ are emitted at the output of the counter Z. The register RG is supplied with timing pulses T and reset pulses RER. The outputs of the register RG are connected with the transistors TD1 through TDn. A signal BR is emitted at the output of the last stage of the register RG. The transistors TD1 through TDn are charged with a signal SLL which is emitted by the transistors TS and TL, and which selectively represents a writing, reading or erasure pulse. During the writing of characters into the memory, the characters are supplied to the memory SP as signals A1 through A7, and, during the reading of the characters, the memory SP emits the characters as signals B1 through B7.

The memory elements of the memory SP are formed as MNOS (metal-nitrite-oxide-substrate) transistors. Due to the application of MNOS transistors, the memory, unlike common semiconductor memories for writing on, maintains its stored characters even after the operational voltage is switched off. The gate insulators of the MNOS transistors consist of a double layer composed of an oxide and a nitride layer. At the boundary surface between these two layers, there are so-called retention positions. These may be recharged by use of a voltage impulse at the gate electrode. The operating voltage of the MNOS transistor is thus shifted. A voltage impulse of opposite polarity reverses the shift of the operating voltage. The binary values 0 and 1 are assigned to the two operating voltages.

The gate terminals of the MNOS transistors of a line and the source and drain terminals of a column are interconnected. In FIG. 2, only four memory elements of the memory SP are shown, which are arranged in two lines and in two columns.

Before writing characters therein, the memory is erased by way of writing-in the binary value 0. For this purpose, all source lines of the transistors are connected with a reference potential, the drain lines of the transistors are connected with an operational voltage UD via the resistors R1 through R7, and the gates of the lines determined by the register RG are charged one after the other with a voltage impulse via the transistor TSL connected to a positive voltage + US.

After erasure of the memory SP, binary values can again be written in. For this purpose, the line wherein the binary values are to be written is determined with the help of the register RG. Thoe columns into which a binary value "1" is to be written are placed at a reference potential via the inputs A1 through A7 with the aid of transistors T1 through T7. By applying a negative writing impulse with the aid of the transistor TSS having a negative voltage US connected thereto, the binary value "1" is subsequently written in the storage cell determined by the register RG and the signals A.

The characters written into the memory SP may be read out as follows. All source lines of the memory elements are connected to a reference potential via the transistors T1 through T7. With the aid of the register RG, the line is selected from which the information is to be read out. Subsequently, a negative voltage −UL is connected to the gate conductors of the selected lines via the transistor TL. Hereafter, the binary signals, which are associated with the binary values of the memory cells will appear as signals B1 through B7.

Semiconductor memories constructed of MNOS transistors are already generally known in the art and are described, for instance, in the magazine "Electronik Industrie", June 5, 1972, Pages 94 and 95.

The circuit arrangement SES, shown in FIG. 3 contains the memory unit SPE and a number of control units for erasing, writing, resetting and reading the circuit arrangement. The procedure for the "writing" operation is controlled by a writing control unit SR. The writing control unit SR is switched on with the help of a signal S1 emitted by a writing key SRT. A command emitted by the reception control EST as signal BS will thus become effective and characters present at the input of a writing gate ST as signals D1 are switched through towards the memory SP as signals A. The characters consist of five bits and a sixth bit which designates the association of the characters with letter or digit parts. The writing gate ST adds a seventh bit to the six bits for control purposes.

The writing control unit SR emits an impulse towards the transistor TSS with the help of a timing impulse emitted by the timing generator TG. This impulse writes the characters presented as signals A onto a line of the memory SP. A message signal MS is emitted towards the reception control EST along with the next timing impulse T indicating that the character has been acquired. Simultaneously, the inputs of the memory SP are locked via the writing gate ST, and the content of the register RG is shifted one position further. Furthermore, the counter Z is switched forward one counting unit. Thus, the writing process is completed for one character. After the removal and re-application of the command BS, the next character is taken over in the same manner. This process can be repeated until the capacity of the memory SP is exhausted.

It is possible with the help of a reset unit RS to set back to the beginning of the memory SP, i.e. to the beginning of a recorded message, and to subsequently read it out. After the actuation of a reset key RST, the timing impulse T is emitted as timing impulse TR, via an OR member D, until a signal is emitted at the output of the register RG. In other words, the register RG triggers the last possible writing position of the memory SP. Since the input and the output of the register are connected via a bypass stage UM, the first position of the register RG is simultaneously prepared. The signal BR via the reset unit RS causes the timing impulse T to be suppressed, causes an impulse RES to be emitted for the zero adjustment of the counter Z, and subsequently, causes the counter Z and the register RG to be switched to 1.

The "reading" operation is triggered by a reading-control unit LE in the following manner. When the memory SP is set back, and the "reading" operation is switched on by a key LET, a reading order BL, arriving from the transmissiion control SST, becomes effective and the memory elements of an intermediate memory ZW are prepared for receiving the characters from the memory SP. The read control unit LE emits an impulse towards the transistor TL for reading out a line from the memory SP.

The intermediate memory ZW receives the characters and subsequently produces a message ML towards the transmission control SST controlled by a signal B7. Simultaneously, the input into the intermediate memory ZW is locked, and the register RG and the counter Z are switched over one position. Thus, the reading process for one character is finished. After the removal and re-application of the command BL, the next character is read out in the same manner.

This process repeats until either the read operation is manually switched off by the key LET, for instance, or, due to the absence of the character B7, the read control LE recognizes that no further characters are present in the memory SP. The characters are processed towards the transmission control SST as signals D to the output of the intermediate memory ZW.

In the case of the writing control unit SR shown in FIG. 4, the signal emitted by the writing key SRT is supplied to a first input of an AND member U1. At the second input of the AND member U1, the signal BS is present which is associated with the "writing" order. When the signals S1 and BS occur simultaneously, a flip-flop F1 is set via the AND member U1. A signal S2 is emitted towards the writing gate ST from the output of the flip-flop, and the signals D1 are switched through to the memory SP as signals A via the writing gate ST. Simultaneously, an AND member U2 is released which switches the timing impulses T1 through to the transistor TSS as timing impulses T1. The timing impulses T1 are also supplied to the timing input of a flip-flop F2 via an inverter N1. The signal S1 is present at the data input of flip-flop 1. Flip-flop F2 is set with the rear portion of the timing impulse T1 and a signal S3 is emitted at the output of F2 which is switched through the counter Z to the register RG via the OR member D. Simultaneously, the flip-flop F1 is set back. The signal S3 is furthermore processed towards the first input of an AND member U3 at whose second input the signal BS is present. The signal MS is emitted at the output of the AND member U3 and indicates to the reception and control unit EST that a character had been taken over by the memory SP. After the removal and re-application of the writing command, the next character under control of the writing control unit SR is written into the memory SP in the same manner.

Figure 5:
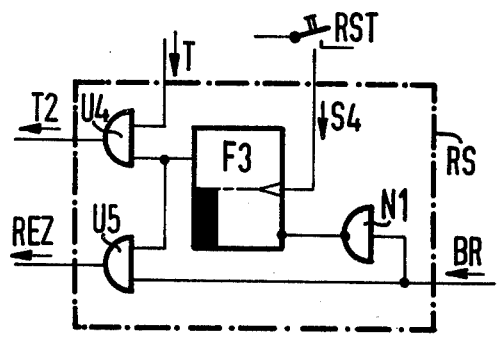
FIG. 5 illustrates a circuit diagram of a reset unit.

The reset unit shown in FIG. 5 for resetting the memory to the beginning of a stored message contains a flip-flop F3 which is set by a signal S4 produced by the reset key RST. The signal at the output of the flip-flop F3 is supplied to the first input of an AND member U4 whose second input is supplied with the timing impulse T. Timing impulses T2 are emitted at the output of the AND member U4 and are supplied to the counter Z and the register RG via the OR member D. When the register RG triggers the last possible writing position of the memory SP it emits the signal BR at its output. This signal BR is applied to the first input of NAND member U5 whose second input is connected with the output of the flip-flop F3. At the output of the NAND member U5 the signal REZ is emitted which sets the counter Z back to its initial value. Furthermore, the signal BR is supplied to the reset input of the flip-flop F3 via its inverter N2. The flip-flop F3 is set back via this reset input as soon as the signal BR occurs, and thus the timing impulses T2 are blocked.

In the case of the read control unit LE shown in FIG. 6, a signal S5 emitted by the reading key LET is supplied to an AND member U6 together with the signal BL representing a read command. The signal at the output of the AND member U6 sets a flip-flop F4 at whose output a signal S6 is emitted towards the intermediate memory ZW. This signal S6 is also present at the first input of a further AND member U7 at whose second input a timing impulse T is present. A timing impulse T3 is directed towards the transistor TL from the output of the AND member U7. The intermediate memory ZW takes over the characters while simultaneously a signal B7 is emitted from the memory towards an AND member U8 of the read control unit LE. Furthermore, the timing impulse T3 which is inverted with the use of an inverter N3, is supplied to the AND member U8. A signal is emitted towards a flip-flop F5, from the output of the AND member U8 to set the AND member. A timing impulse T4 appears at the output of the flip-flop F5 and is processed towards the counter Z and the register RG via the OR member D. Furthermore, a signal ML is directed to the writing control SST via an AND member U9. Simultaneously, the flip-flop F4 is set back. After the removal and reapplication of the read command represented by the signal BL, the next character is read out from the memory in the same manner. This process repeats until either the operation "reading" is switched off manually by the key LET and thus the AND member U6 is locked, or the read control unit LE recognizes, due to the absence of signal B7, that no further characters are present in the memory.

The erasure control unit LO shown in FIG. 7 serves for erasing the memory before a new message is stored. When the erasure key LOT is actuated, a signal is emitted towards a flip-flop F6 of the erasure control unit LO, setting it back. At the output of the flip-flop F7, a signal S8 is directed to the writing gate ST, preparing it for writing the binary values "0" into the memory. The signal S8 is also directed to a first input of a NAND member U10 whose second input is supplied with the signal S7, which was inverted via an inverter N4. A signal is emitted at the output of the NAND member U10, setting back the counter Z and the register RG. The signal S9 sets a flip-flop F8 via an AND member U11, and also sets back flip-flop F9. The outputs of the flip-flops F8 and F9 are connected with an AND member U12 which is also supplied with the timing impulse T. A timing impulse T5 at the output of AND member T12 is directed to the transistor TSL. Furthermore, the timing impulse T5 is supplied to the counter Z and the register RG, as signal T6, via an inverter N5 and the OR member D. The contents of the counter Z and the register RG are switched forward with the negative portion of the timing impulse T6. After $n$ pulses, a signal BZ occurs at the output of the counter Z indicating that the number of timing impulses T5 corresponding to the number of digits or number of lines of memory, respectively, had been put in or erased, respectively. The signal BZ sets back the flip-flops F7 and F9 and causes the blocking of further timing impulses T6.

The circuit arrangement SES may be provided with an arrangement for correcting erroneously inserted characters. The memory may be set back character-by-character with the help of a correction key such that all characters set back in such manner are automatically erased. The number of characters for which the set back operation was not carried out may, for instance, be represented by a luminous numerical indicator. It is thereby advantageous to arrange the bypass stage UM between the output and the input of the register RG. It contains, for instance, a shift register with fifteen digits. Each position of the shift register of the stage UM is triggerable by a correction control. Thus, a signal put into the bypass stage UM must pass through from zero to fifteen positions of the bypass stage UM, depending on the triggering.

The circuit arrangement SES may also be provided with a synchronizing unit which automatically searches the next position in the register SP which can be written on, and correspondingly synchronizes the counter Z and the register RG.

Although various minor modications may be suggested by those versed in the art, it should be understood that we wish to embody within the scope of the patent warranted hereon, all such embodiments as reasonably and properly come within the scope of our contribution of the art.

We claim as our invention:

1. A circuit arrangement for storing messages formed of Teletype characters in a Teletype system having a reception control which can be supplied with Teletype characters from a Teletype line and an input device, and which contains a transmission control which can emit Teletype characters towards a Teletype line and the reception control, comprising:
    (a) a read and write memory unit supplied with Teletype characters from received and written-in messages via the reception control; and
    (b) a read and write memory means in said memory unit having electronically triggerable memory elements for storage of Teletype characters which are not changed when an operational voltage feeding the memory unit is switched off, said memory means emitting the Teletype characters of a message which is to be transmitted to the transmission control.

2. A circuit arrangement in accordance with claim 1, characterized in that a semiconductor memory is provided as said memory means comprising MNOS (metal-nitrite-oxide substrate) transistors which can be written on as often as desired.

3. A circuit arrangement in accordance with claim 1, characterized in that the memory elements in the memory means are arranged in the form of a matrix formed of several lines and several columns.

4. A circuit arrangement in accordance with claim 3, characterized in that the memory contains a register means associated with the memory means whose number of digits is equal to the number of the lines of the memory means for being written on or read out, respectively, said register means having means for indicating which line of the memory means is to be written on or read out.

5. A circuit arrangement in accordance with claim 3, characterized in that the memory unit contains a counter means whose counting capability is equal to the number of the lines of the memory means which are to be written on or to be read out, respectively, and which emits a signal at its output when all characters of the memory means have been written or read out.

6. A circuit arrangement in accordance with claim 1, characterized in that the memory unit is connected with a write control unit means which is supplied with a signal from the reception control triggering the storage of the Teletype characters, said write control unit means emitting a signal towards a writing gate for switching the Teletype characters which are to be stored through to the memory means, and said write control unit means producing the signals with the help of which the Teletype characters are written into the memory means.

7. A circuit arrangement in accordance with claim 1, characterized in that the memory unit is connected with a read control unit means which is supplied with a signal triggering a read-out of the Teletype characters from the memory means, and which emits signals towards the memory unit with the aid of which the Teletype characters are read out from the memory means, and which emits a signal towards an intermediate memory means with the aid of which the read-out Teletype characters are intermediately stored in the intermediate memory means.

8. A circuit arrangement in accordance with claim 3, characterized in that the memory unit is connected with a reset control unit means which is supplied with a signal triggering a reset of the memory means to the beginning of a message, and which emits the signals to a counter and a register with the aid of which the counter and the register are set back to initial values associated with the beginning of a message.

9. A circuit arrangement in accordance with claim 1, characterized in that an erasure-control unit means is provided which is supplied with a signal triggering an erasure of the memory means and which emits a signal towards a writing gate which causes there the emission of equal binary values and which emits signals towards the memory unit with the aid of which these binary values are written into the memory means.

10. A circuit arrangement in accordance with claim 1 in which correction means are provided which allow the correction of individual Teletype characters in the memory means.

11. A circuit arrangement of claim 10 in which said reception control automatically finds a position in the memory means which can be written on.

12. A Teletype system adapted for storage of Teletype messages, comprising:
 (a) an input device;
 (b) a reception control means supplied with Teletype characters from said input device;
 (c) a Teletype line;
 (d) a transmission control means for emitting Teletype characters to the Teletype line;
 (e) a read and write memory iunit supplied with Teletype characters from the reception control; and
 (f) a read and write memory means in said memory unit having electronically triggerable memory elements for storage of the Teletype characters which are not changed when an operational voltage feeding the memory unit is switched off, said memory means emitting stored Teletype characters to the transmission control when transmission is desired.

13. The Teletype system of claim 12 in which the reception control means also receives Teletype characters from the Teletype line and said transmission control also emits Teletype characters to the reception control means.

* * * * *

UNITED STATES PATENT OFFICE
CERTIFICATE OF CORRECTION

Patent No. 4,072,819           Dated February 7, 1978

Inventor(s) MARTIN LUDWIG and WENNEMAR EICKENSCHEIDT

It is certified that error appears in the above-identified patent and that said Letters Patent are hereby corrected as shown below:

IN THE ABSTRACT

Lines 2, 3, 4, 5, 6, 9 and 11 "Teletype" at each occurrence should be deleted and --teletypewriter-- substituted.

IN THE SPECIFICATION

Column 1, lines 9, 12, 13 (two occurrences), 15, 16, 18, 42, 47, 51, 53 and 66, delete "Teletype" and substitute --teletypewriter--.

Column 2, lines 10, 18, 27, 29, 32, 33, 35, 38, 40, 57 and 60, delete "Teletype" and substitute --teletypewriter--.

Column 3, lines 18, 28, 31, 32, 33, 61 and 65, delete "Teletype" and substitute --teletypewriter--.

UNITED STATES PATENT OFFICE
CERTIFICATE OF CORRECTION

Patent No. 4,072,819     Dated February 7, 1978

Inventor(s) MARTIN LUDWIG and WENNEMAR EICKENSCHEIDT

It is certified that error appears in the above-identified patent and that said Letters Patent are hereby corrected as shown below:

IN THE CLAIMS

Column 8, lines 28, 29, 30, 32, 34, 39, 42, delete "Teletype" and substitute --teletypewriter--.

Column 9, lines 5, 7, 10, 15, 18, and 21, delete "Teletype" and substitute --teletypewriter--.

Column 10, lines 7, 12, 15, 17, 18, 19, 20, 24, 27, 29, 30, 31 and 32, delete "Teletype" and substitute --teletypewriter--.

Signed and Sealed this

Eighth Day of August 1978

[SEAL]

Attest:

RUTH C. MASON
*Attesting Officer*

DONALD W. BANNER
*Commissioner of Patents and Trademarks*